(12) United States Patent
Grimsrud

(10) Patent No.: US 8,009,475 B2
(45) Date of Patent: Aug. 30, 2011

(54) DEVICE SELECTION CIRCUIT AND METHOD

(75) Inventor: Knut S. Grimsrud, Forest Grove, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 12/653,081

(22) Filed: Dec. 8, 2009

(65) Prior Publication Data

US 2010/0091587 A1    Apr. 15, 2010

(51) Int. Cl.
*G11C 16/04*    (2006.01)
*G06F 13/00*    (2006.01)

(52) U.S. Cl. ............. 365/185.11; 365/185.33; 711/115; 711/154

(58) Field of Classification Search ............... 365/185.11
See application file for complete search history.

(56) References Cited

U.S. PATENT DOCUMENTS

| | | | |
|---|---|---|---|
| 4,566,082 A | 1/1986 | Anderson | |
| 5,453,990 A * | 9/1995 | Aoki et al. | 714/712 |
| 5,818,350 A | 10/1998 | Estakhri et al. | |
| 5,907,512 A | 5/1999 | Parkinson et al. | |
| 6,078,526 A | 6/2000 | Mitani | |
| 6,226,724 B1 | 5/2001 | Biggs | |
| 6,396,747 B2 * | 5/2002 | Kubo et al. | 365/189.05 |
| 6,466,049 B1 | 10/2002 | Diba et al. | |
| 6,535,422 B2 | 3/2003 | Goto et al. | |
| 6,775,169 B1 | 8/2004 | d'Acoz et al. | |
| 6,788,592 B2 | 9/2004 | Nakata et al. | |
| 6,868,011 B2 * | 3/2005 | Sung et al. | 365/185.17 |
| 6,957,308 B1 | 10/2005 | Patel | |
| 7,345,926 B2 * | 3/2008 | Kagan et al. | 365/185.33 |
| 7,376,043 B2 * | 5/2008 | Murayama | 365/233.1 |
| 7,688,628 B2 * | 3/2010 | Grimsrud | 365/185.11 |
| 2003/0137881 A1 | 7/2003 | Sasaki | |
| 2004/0193737 A1 | 9/2004 | Huffman et al. | |
| 2005/0071600 A1 | 3/2005 | Bungo | |
| 2005/0267997 A1 | 12/2005 | Melvin | |
| 2007/0079015 A1 | 4/2007 | Royer, Jr. et al. | |
| 2007/0089031 A1 | 4/2007 | Huffman et al. | |

OTHER PUBLICATIONS

"Open NAND Flash Interface Specification, Revision 1.0", Dec. 28, 2006, 106 pages.

* cited by examiner

*Primary Examiner* — Son L Mai
(74) *Attorney, Agent, or Firm* — Erik R. Nordstrom

(57) ABSTRACT

Embodiments of the invention take advantage of an unused state of an interface protocol (or specification), such as the ONFI specification, to control a selector circuit to assert one of a plurality of relatively localized device selection signals (e.g., chip enable signals).

15 Claims, 2 Drawing Sheets

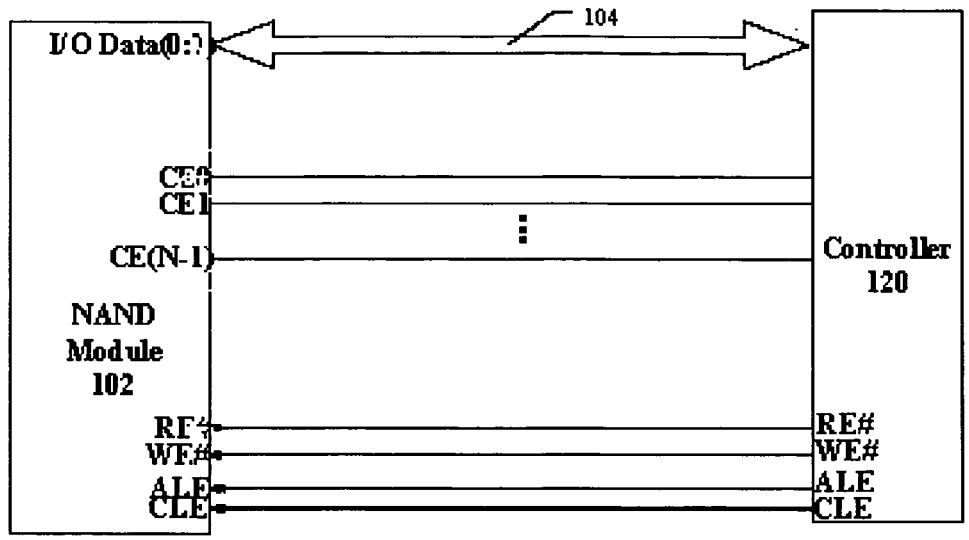
FIGURE 1A
Prior Art
| CLE | ALE | MODE |
|---|---|---|
| 0 | 0 | NO OP |
| 1 | 0 | COMMAND |
| 0 | 1 | ADDRESS |
| 1 | 1 | NOT ALLOWED |
FIGURE 1B
Prior Art
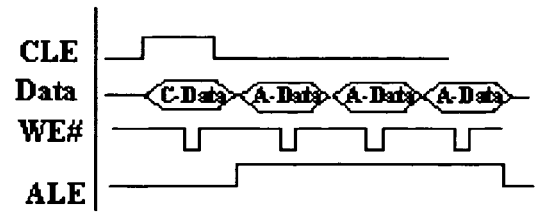
FIGURE 1C
Prior Art

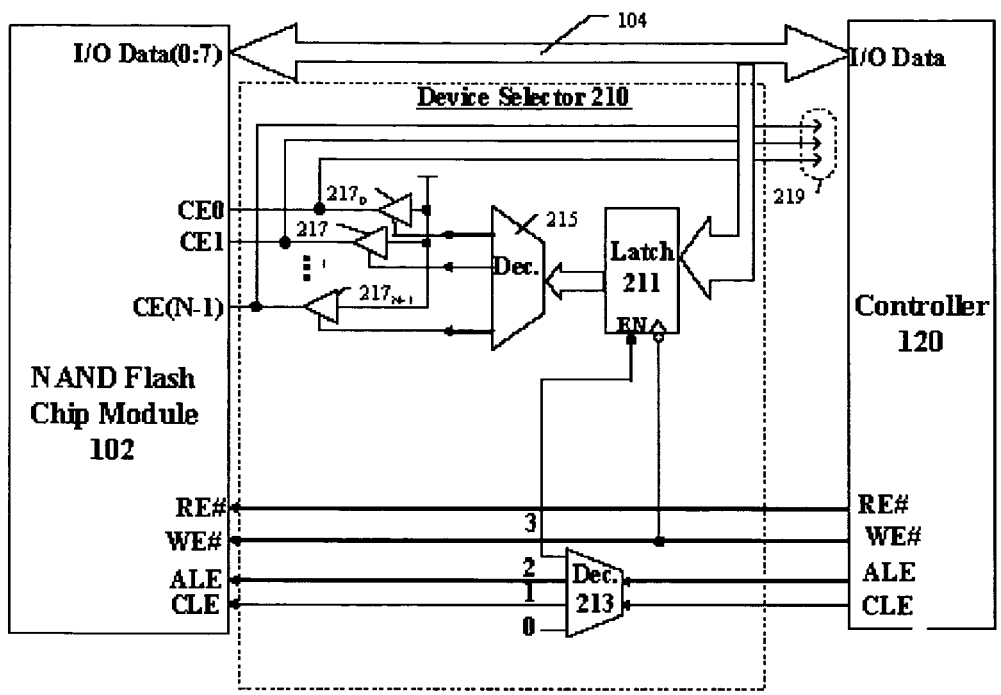
FIGURE 2A
| CLE | ALE | MODE |
|-----|-----|---------|
| 0 | 0 | NOOP |
| 1 | 0 | COMMAND |
| 0 | 1 | ADDRESS |
| 1 | 1 | CE SEL. |
FIGURE 2B
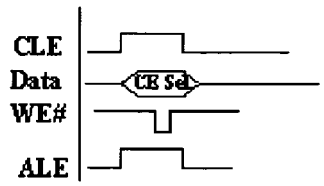
FIGURE 2C

DEVICE SELECTION CIRCUIT AND METHOD

RELATED APPLICATIONS

This application is related and claims priority to U.S. patent application Ser. No. 11/772,188 titled "DEVICE SELECTION CIRCUIT AND METHOD", which was filed on Jun. 30, 2007; this application is entirely incorporated by reference.

BACKGROUND

FIG. 1A shows a portion of a conventional NAND flash system. It generally comprises a NAND FLASH chip module (chip module) 102 coupled to a controller 120 through various signal lines and one or more data buses 104. The signal lines include chip enable lines (CE0 to CEN-1), a write enable line (WE#), a read enable line (RE#), an address latch enable (ALE) line, and a command latch enable (CLE) line. The data bus (I/O Data[0:7]) is an 8-bit bus for writing data into and reading it from the module. (Other signals, not necessarily required for understanding the invention, may not be shown.)

The NAND flash chip module 102 comprises N (e.g., 4, 20, or even more) individual NAND flash chips coupled together to provide increased memory space. Each chip has a separate chip enable input to be asserted when one or more of its cells is to be accessed. Accordingly, the system has the N separate chip enable signals (CE0 to CEN-1) coupled between the module 102 and controller 120 for selectably accessing the separate chips in the module.

A popular NAND flash interface is the Open NAND Flash Interface (ONFI) specification. The specification uses the CLE and ALE signals for writing an instruction (command code plus address) into the module. The CLE and ALE signals indicate to the module whether a command code or address portion will be coming over the data bus 104. The write and read enable signals, respectively, cause data on the bus to be written into the module or to be read from the module to the controller via the data bus 104.

FIG. 1B is a truth table showing the different operating modes for the ALE and CLE signals in the ONFI specification. When both signals are de-asserted (e.g., '0), the module is in a NOOP state, which is an allowed but inactive state. When the CLE is asserted and the ALE is de-asserted, the module is in a command mode, which signifies to the module that data to be written into it corresponds to a command instruction. On the other hand, when the ALE is asserted and the CLE is de-asserted, then the module is in an address mode, indicating to it that data to be written into it is address data.

FIG. 1C shows a timing diagram for the signal lines when an instruction is written to the module to execute a memory operation. Initially, the CLE line is asserted, indicating that a command byte will be coming from the bus. A command code (e.g., single byte, 8-bit) command code) is then placed by the controller 120 onto the bus. Next, the write enable signal (active low here) is strobed to write the command code into the module. Next, the CLE line de-asserts, and the ALE line asserts, indicating that the address for the command is coming. In the depicted embodiment, a 24-bit address is used, so three separate address bytes are strobed into the module while the ALE is asserted and CLE is de-asserted. From here, depending on the specified command, data is usually then read from or written to one or more cells, as specified by the address.

Having the ability to facilitate multiple chip enable signals increases the parallelism of operations and improves overall performance. Unfortunately, however, a relatively high number of chip enable lines can be costly in that it may require excessive routing and/or pin-outs. For example, in a solid-state NAND flash drive with ten packages (2 chips per package), 20 separate chip enable lines may be required.

Accordingly, a new approach is desired.

BRIEF DESCRIPTION OF THE DRAWINGS

Embodiments of the invention are illustrated by way of example, and not by way of limitation, in the figures of the accompanying drawings in which like reference numerals refer to similar elements.

FIG. 1A is a diagram of a portion of a conventional NAND flash system.

FIG. 1B is a truth table for instruction modes based on ALE and CLE signal values for the system of FIG. 1A.

FIG. 1C is a timing chart showing how an instruction is sent to a flash module in the system of FIG. 1A.

FIG. 2A is a diagram of a portion of a NAND flash system with a device selection circuit in accordance with some embodiments.

FIG. 2B is a truth table for instruction modes, including a chip enable select mode, for the system of FIG. 2A in accordance with some embodiments.

FIG. 2C is a timing chart showing how a chip enable signal is asserted for a selected chip in the system of FIG. 2A.

DETAILED DESCRIPTION

Embodiments of the invention take advantage of an unused state of an interface protocol (or specification), such as the ONFI specification, to control a selector circuit to assert one of a plurality of relatively localized device selection signals (e.g., chip enable signals). For example, in some NAND flash implementations, it may use an otherwise unused state of control signals (e.g., ALE and CLE signals when they are both asserted) to perform a more localized chip enable select function thereby eliminating the need to have a relatively longer (and/or otherwise more costly) chip enable signal for each NAND flash chip. In some embodiments, the approach may allow for a large number of devices to be ganged in a design without, for example, the need for a corresponding number of pins, and/or extended lines.

FIG. 2A shows a NAND flash system, such as that shown in FIG. 1A, but with a device selector circuit 210 to provide local chip enable signals for the NAND flash chips in the NAND flash module 102. The selector circuit 210 generally comprises a latch 211, a control signal decoder 213, a device select decoder 215, and N drivers ($217_0$ to $217_{N-1}$), all coupled together as shown.

In the depicted embodiment, the latch 211 is a multi-bit latch having a sufficient number of bits to latch enough data-bus bits to support selection of the N separate devices. For example, if the module comprises 20 chips, each with a chip enable input (N=20), then only five of the data bus bits (e.g., I/O Data[0:4]) would be needed for the latch 211, and a 5:32 bit decoder could be used for decoder 215. (Twelve of the decoder 215 outputs would not be needed.)

In the depicted embodiment, the control signal decoder 213 is a 2:4 decoder for decoding the ALE and CLE signals from controller 120 and controlling the corresponding module inputs in accordance with existing protocol. In addition, it enables the selector circuit to assert a desired chip enable signal within unused control signal state. This is reflected in the truth table of FIG. 2B.

In the depicted embodiment, the unused state is when ALE and CLE are both asserted at the same time. When both ALE and CLE are de-asserted, then the decoder output 0 (which is not coupled to the module) is asserted (other outputs de-asserted), resulting in the system being in a NOOP mode. Alternatively, if CLE is asserted with ALE de-asserted, then the decoder output 1 (which is coupled to the module CLE input) is asserted, resulting in the system being in a command mode, as with a conventional implementation. Likewise, if ALE is asserted with CLE de-asserted, then decoder output 2 (which is coupled to the module ALE input) asserts, resulting in the system being in an ALE address mode. However, if both ALE and CLE are asserted, then decoder output 3 (which is coupled to an enable input of latch 211) asserts, resulting in the system being in the new chip enable select mode. This mode occurs with an unused state of the CLE and ALE signals, so the circuit can readily be used with existing designs. (It should be appreciated, however, that it could also be used with new designs that may or may not implement a currently used protocol.)

With additional reference to FIG. 2C, operation of the device selector (chip enable selector in this depiction) to select a chip in the module will be discussed. When the controller is to assert a particular chip enable signal, it asserts both the ALE and CLE signals, causing decoder 213 output 3 to assert, which asserts an enable input of latch 211 to activate the latch. The controller then places an appropriate data byte on the bus 104 to select a desired chip. For example, if it wanted to assert chip enable signal CE5, it would put '0000101 on the bus. (Note that in contrast, if it wanted to de-select all of the chip enable signals, it could put a value not associated with a chip enable signal such as '10000000, from the above example, on the bus to cause all of the chip enable signals to be de-asserted by the decoder 215. For the same result, it could alternatively leave decoder output 0 unconnected and couple decoder output 1 to the first driver 217$_0$, decoder output 2 to the second driver 217$_1$ and so on so that all chips would be deselected when the latch outputs all '0s. This may be beneficial when a default state of all chip enable signals being de-asserted is desired, e.g., at power-up.) It then asserts the write enable signal (WE#, active low), which is coupled to a clock input of latch 211. (Note that it doesn't matter if the data is on the bus before or after the CE Sel. mode is entered, so long as the data and latch enable signals are stable when the WE# is strobed.)

This causes the latch 211 to capture the chip enable selection value from the data bus. This value is thus provided to decoder 215, which asserts its output signal that corresponds to this value. The asserted signal causes its associated driver 217 to activate and couple its applied High to the associated chip enable signal to select the appropriate chip in the module. From here, the latch keeps the selected chip enable signal asserted until a different chip is to be selected in a subsequent chip enable select phase.

Note that in the depicted embodiment, the drivers 217 are implemented with tri-stateable drivers, activated by associated outputs from the selector decoder 215. In cooperation with connector inputs 219, which are coupled to the chip enable inputs (CE0 to CEN-1), this may be beneficial for implementing a module that can operate with both conventional controllers and new controllers, designed with a selector circuit such as 210 in mind. That is, a conventional controller could still operate with a module having a selector 210 integrated into it (or coupled in front of it). It would bypass the selector circuit, with it's chip enable connectors coupled to the module via connections 219. At the same time, a controller configured to operate with a selector 210 would also work, as discussed above, with the connector contacts 219 left unconnected. ((With the use of tri-stateable drivers such as 217, it may be desirable to use circuits to provide weak pull downs for the module chip enable inputs).

It should be appreciated that a selector circuit, as taught herein, may be implemented in a variety of different ways. For example, it could be implemented as shown in FIG. 2A on a circuit board between a controller and NAND flash module, as shown in the figure. Such a design could be used, e.g., for a solid-state NAND flash drive in a computer, it could be used to provide flash memory to facilitate a fast wake-up feature in a computer, or it could even be used in a USB flash drive between a USB controller and a flash module. In other embodiments, a selector circuit could be disposed in the module itself. That is, it could be disposed within the module, e.g., as part of an integrated circuit, downstream from the indicated module signals, which could allow the external host (e.g., controller) to be coupled to the module without the need for any chip enable connections, although as just discussed, such a module could have connections 219 to facilitate use with legacy controllers.

In the preceding description, numerous specific details have been set forth. However, it is understood that embodiments of the invention may be practiced without these specific details. For example, while embodiments were primarily discussed using an exemplary flash implementation, there is no reason why the disclosed selector circuit principles couldn't apply to other module signals to be selected. It could apply to chip enable signals for other types of chips, e.g., DRAM chips, or it could even apply to other signal types.

In other instances, well-known circuits, structures and techniques may have not been shown in detail in order not to obscure an understanding of the description. With this in mind, references to "one embodiment", "an embodiment", "example embodiment", "various embodiments", etc., indicate that the embodiment(s) of the invention so described may include particular features, structures, or characteristics, but not every embodiment necessarily includes the particular features, structures, or characteristics. Further, some embodiments may have some, all, or none of the features described for other embodiments.

In the preceding description and following claims, the following terms should be construed as follows: The terms "coupled" and "connected," along with their derivatives, may be used. It should be understood that these terms are not intended as synonyms for each other. Rather, in particular embodiments, "connected" is used to indicate that two or more elements are in direct physical or electrical contact with each other. "Coupled" is used to indicate that two or more elements co-operate or interact with each other, but they may or may not be in direct physical or electrical contact.

The invention is not limited to the embodiments described, but can be practiced with modification and alteration within the spirit and scope of the appended claims. For example, it should be appreciated that the present invention is applicable for use with all types of semiconductor integrated circuit ("IC") chips. Examples of these IC chips include but are not limited to processors, controllers, chip set components, programmable logic arrays (PLA), memory chips, network chips, and the like.

It should also be appreciated that in some of the drawings, signal conductor lines are represented with lines. Some may be thicker, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

It should be appreciated that example sizes/models/values/ranges may have been given, although the present invention is not limited to the same. As manufacturing techniques (e.g., photolithography) mature over time, it is expected that devices of smaller size could be manufactured. In addition, well known power/ground connections to IC chips and other components may or may not be shown within the FIGS., for simplicity of illustration and discussion, and so as not to obscure the invention. Further, arrangements may be shown in block diagram form in order to avoid obscuring the invention, and also in view of the fact that specifics with respect to implementation of such block diagram arrangements are highly dependent upon the platform within which the present invention is to be implemented, i.e., such specifics should be well within purview of one skilled in the art. Where specific details (e.g., circuits) are set forth in order to describe example embodiments of the invention, it should be apparent to one skilled in the art that the invention can be practiced without, or with variation of, these specific details. The description is thus to be regarded as illustrative instead of limiting.

What is claimed is:

1. An apparatus, comprising:
   a selector circuit to provide within a module a selected one of a plurality of die selection signals within the module in response to receiving an otherwise previously unused combination of instruction control signals from an interface specification.

2. The apparatus of claim 1, in which the circuit comprises a decoder circuit to couple used combinations of the instruction control signals to the module and to provide the selected device selection signal to the module when receiving the unused combination.

3. The apparatus of claim 2, in which the circuit comprises a latch to latch a value from a data bus in response to the decoder receiving the unused combination, the value corresponding to the selected device selection signal.

4. The apparatus of claim 3, comprising a second decoder circuit coupled to the latch to assert the selected device selection signal in response to receiving the value from the latch.

5. The apparatus of claim 4, in which the instruction control signals comprise command and address latch enable signals.

6. The apparatus of claim 4, in which the latch is to be clocked by a write enable signal.

7. The apparatus of claim 6, in which the module is a NAND flash module comprising NAND flash chips, each with one of the plurality of chip enable signals corresponding to the plurality of device selection signals.

8. An apparatus, comprising:
   a solid state drive having:
      a NAND flash module having a plurality of NAND flash chips, each chip with an associated chip enable input;
      a controller within the drive to write data into and read data from the drive; and
      a selector circuit to select one of the chip enable inputs in response to receiving an otherwise unused combination of instruction control signals.

9. The system of claim 8, in which the selector circuit comprises a decoder circuit to couple used combinations of the instruction control signals from the controller to the module and to cause the selected chip enable input to be selected when receiving the unused combination.

10. The system of claim 9, in which the selector circuit comprises a latch to latch a value from a data bus in response to the decoder receiving the unused combination, the value corresponding to the selected chip enable signal.

11. The system of claim 10, comprising a second decoder circuit coupled to the latch to assert the selected chip enable input in response to receiving the value from the latch.

12. The system of claim 11, in which the instruction control signals comprise command and address latch enable signals.

13. The system of claim 11, in which the latch is to be clocked by a write enable signal from the controller.

14. The system of claim 8, in which the module is a solid-state NAND flash drive and the controller is part of the module.

15. The system of claim 13, in which the controller is part of a computer system to interface between the computer system and the module.

* * * * *